United States Patent
Kuehnle

[11] Patent Number: 5,886,450
[45] Date of Patent: Mar. 23, 1999

[54] TOROIDAL ELECTRICAL MOTOR/ GENERATOR

[76] Inventor: Manfred R. Kuehnle, P.O. Box 1020, New London, N.H. 03257

[21] Appl. No.: 6,261

[22] Filed: Jan. 13, 1998

[51] Int. Cl.[6] .................................................. H02K 1/22
[52] U.S. Cl. .......................... 310/261; 310/159; 310/164; 310/254; 310/268; 310/258; 310/156
[58] Field of Search ..................................... 310/156, 159, 310/164, 254, 268, 258; 29/596, 598

[56] References Cited

U.S. PATENT DOCUMENTS

| | | | |
|---|---|---|---|
| 3,174,354 | 3/1965 | Kuehnle | 74/750 |
| 4,281,263 | 7/1981 | Virolleau et al. | 310/13 |
| 4,297,604 | 10/1981 | Tawse | 310/168 |
| 4,297,919 | 11/1981 | Kuehnle | 74/750 R |
| 4,439,702 | 3/1984 | Belikov et al. | 310/80 |
| 4,608,505 | 8/1986 | Schumacher | 310/267 |
| 4,639,626 | 1/1987 | McGee | 310/155 |
| 5,334,899 | 8/1994 | Skybyk | 310/268 |
| 5,404,063 | 4/1995 | Mills | 310/266 |
| 5,598,591 | 2/1997 | Lillington et al. | 310/164 |

*Primary Examiner*—Nestor Ramirez
*Assistant Examiner*—Elvin G. Enad
*Attorney, Agent, or Firm*—Cesari and McKenna, LLP

[57] ABSTRACT

An electrical motor includes a stator housing having a toroidally shaped inner cavity. A plurality of stator electromagnets are mounted along the cavity wall in a plurality of parallel helical paths. A plurality of rotor members are rotatively mounted at fixed, spaced-apart angular positions around a ring shaft whose axis is coincident with the axis of the toroidal cavity. Each rotor member includes a plurality of permanent magnets mounted around its circumference. A linear output shaft has one end connected to the ring shaft and its other end extending out of the stator housing. By properly energizing the stator electromagnets, electromagnetic fields set up by them and the rotor magnets interact to produce torque which causes the rotor members to rotate about the ring shaft and to precess laterally causing the ring shaft, and attached linear output shaft, to rotate relative to the stator housing. The toroidal configuration of the motor provides a larger volume electromagnetic field interaction space than conventional cylindrical motors which yields higher output powers and higher torques. The motor, which also has an inherent speed reduction feature, may be operated in reverse as an electrical generator.

21 Claims, 2 Drawing Sheets

TOROIDAL ELECTRICAL MOTOR/ GENERATOR

BACKGROUND OF THE INVENTION

This invention relates generally to the field of electrical machinery. It relates more particularly to an electrical motor which utilizes a unique toroidal rotor/stator configuration providing a larger volume electromagnetic field interaction space and higher output torque than conventional cylindrical motors. The motor also has an inherent output speed reduction characteristic. It may also be operated in reverse by rotatably driving its output shaft from an external source, and thus function as an electrical generator.

Electrical motors consist of two basic machine parts—a stator, or stationary part, which typically defines a generally cylindrical internal cavity, and a rotor, or rotating part, which is also generally cylindrical in shape and which rotates about its central axis inside the stator cavity. Both the stator and the rotor typically have electromagnetic field-producing elements such as conductor windings through which electrical currents are passed. The rotor and stator are separated by a thin air gap. An output shaft is coaxially connected to the rotor so that it rotates with the rotor about the rotor axis.

In operation, a rotating electromagnetic field is set up across the tube-like air gap between the stator and rotor by energizing the windings on the stator or rotor or both with varying electrical signals. According to well-known principles of electromagnetic theory, the rotor and stator electromagnetic fields tend to line up, to minimize free potential energy, so that the center line of a north pole on one machine member (e.g. the rotor) is directly opposite the center line of a south pole on the other machine member (e.g., the stator). The tendency of the interacting fields to line up in this fashion produces the torque, or turning force, that rotates the rotor relative to the stator. The power output of the motor is proportional to the product of its torque and the rotational speed of its output shaft.

There are a wide variety of electrical motor designs, all having the same basic cylindrical rotor/stator configuration and all operating on the same basic electromagnetic principles, but each generally having different performance characteristics. For example, there are a-c motors which involve the supply of alternating electrical current to the windings of at least one of the stator and rotor. There are also d-c motors which involve the supply only of direct electrical current to the stator and/or rotor windings. A-C motors, in turn, may be synchronous, induction-type, single phase or polyphase, depending upon the particular manner in which input current signals are supplied. Similarly, d-c motors may be series-type, shunt-type or compound, depending upon the manner in which the rotor and stator windings are interconnected. Even these motor classifications often have subclassifications. For example, a-c polyphase motors may be either Y- or Δ-connected, depending upon how the windings for each phase are interconnected.

Selecting the right type of electrical motor for a given application depends to a large degree on the conditions within the mechanical equipment that the motor is intended to drive. For example, some applications require a motor speed which remains substantially constant as load varies, while others require an absolutely constant speed that is adjustable over a range. In still other applications, the torque which the motor is capable of supplying while starting, and the maximum torque which it can furnish while running, are factors of prime importance. Each of the different types of electrical motors that exist have different torque, speed and power characteristics which a user can seek to match to the particular requirements of the driven equipment application. When properly matched to the load, all of these motors generally operate at relatively high efficiencies.

Like all electromechanical devices, however, electrical motors have physical limitations which make it difficult to achieve a proper match to the driven equipment requirements in all cases. One of the most fundamental limitations in all electrical motor designs derives from the basic fact that the torque and power output of a motor are dependent upon the physical size of the electromagnetic field interaction space defined by the motor's rotor and stator. The motor designer who requires higher power output and/or higher torque with a particular type of motor generally achieves this by using a larger volume cylindrical rotor/stator configuration. In other words, the designer simply makes the motor with a larger diameter and/or longer rotor/stator. This approach is due principally to the fact that cylindrical rotors and straight, coaxially-positioned rotor output shafts have been considered axiomatic in electrical motor design since very early on in their practical development.

Similar approaches are used in the design of electrical generators, which are functionally and structurally basically the same as electrical motors except that the rotor in a generator is driven in rotation from an external source and the interacting electromagnetic fields are used to generate electricity. With electrical generators as well, higher power outputs and higher torques are conventionally achieved by using larger diameter and/or longer rotor/stator structures.

SUMMARY OF THE INVENTION

The present invention departs from the conventional design approach that has prevailed for decades by utilizing a unique toroidal rotor/stator configuration and unique rotor-to-output shaft mechanical coupling arrangement which provide a larger volume electromagnetic field interaction space than conventional cylindrical, coaxial shaft designs. The invention is based on the realization that the kinematic system used heretofore in toroidal transmissions, such as those disclosed in my prior U.S. Pat. Nos. 3,174,354, Re. 26,476 and 4,297,919, may advantageously be adapted for use in an electrical motor/generator application.

Briefly, an electrical machine embodied in accordance with the invention comprises a stator defining an inner cavity having the general shape of a geometrical doughnut or torus. The toroidal stator cavity has a closed, ring-shaped circular axis. The stator also includes a plurality of electromagnetic field-producing stator elements, such as electromagnets, arranged along one or more generally parallel helical paths at the periphery of the toroidal inner cavity. Positioned in the cavity are a plurality of similar rotor members rotatively mounted at fixed, spaced-apart angular positions around a circular shaft or ring having an axis which is coincident with the circular axis of the cavity. Each rotor member has a plurality of electromagnetic field-producing rotor elements, such as permanent magnets, positioned around its circumference, in close proximity to the stator elements formed in helical paths at the periphery of the cavity. A linear shaft is connected at one end to the ring supporting the rotor members, with its other end extending out of the cavity. Thus, the linear shaft has an axis of rotation that is normal to the plane of the ring.

The machine of the invention may be operated either as an electrical motor or an electrical generator. In accordance with one embodiment of the invention, the machine is operated as an electrical motor by energizing the stator elements in the stator cavity with electrical voltages of alternating polarities. These voltages set up electromagnetic fields in the stator cavity having poles that appear to travel along the helical paths and that interact with the poles of the electromagnetic fields produced by the rotor elements. Because the like poles of these fields tend to repeal each other and the opposite poles of these fields tend to line up with one another, the rotor elements will seek to follow the traveling electromagnetic fields produced by the stator elements, producing torque which causes the rotor members to rotate about the ring. Due to the helical arrangement of the stator elements, the rotor members, in addition to rotating about the ring, also precess along the ring axis. Since the rotor members are fixed axially to the ring, they act together to cause the ring to rotate relative to the stator. The rotation of the ring is, in turn, coupled to the linear shaft as the output of the motor. The speed of the output shaft is a function of the frequency with which the polarities of the input voltages are alternated.

An electrical motor embodied in accordance with the invention takes full advantage of the available torus space in the stator. Thus, the motor has a much larger volume electromagnetic field interaction space than is possible with conventional cylindrical motors of similar overall size. The result is generally higher output power and higher torque for a similarly sized motor.

Additionally, the lead angle or pitch of the helical paths along which the stator elements are arranged, and the number of rotor elements on each rotor member, can be selected so that the rotor members revolve several times about the ring before the ring, and the output shaft connected to it, complete a single precessional revolution relative to the stator. Thus, an electrical motor embodied in accordance with the invention has a speed reduction characteristic that is inherent in its design, and that is achieved without the added bulk, weight and other problems typically associated with gear reduction mechanisms. For example, an electrical motor embodied in accordance with the invention may be designed to operate at relatively high input frequencies, while achieving relatively low output speeds, with inherent speed reduction factors of 24:1 or more. Because the motor can be operated at such high input frequencies, the electromagnetic field-producing stator elements may be relatively small, low voltage electromagnets. This also allows the stator to be compact in design, reducing the overall size and weight of the motor.

Those skilled in the art will appreciate that, like other electromechanical devices, the electrical machine of the present invention may be operated in reverse by mechanically driving the linear shaft in rotation from an external source. In that case, the interacting electromagnetic fields in the toroidal rotor/stator space are used to generate electrical currents in the stator elements which are extracted in a known way from the machine for utilization.

BRIEF DESCRIPTION OF THE DRAWINGS

The foregoing and other features and advantages of the invention will be better understood by reference to the following detailed description taken in conjunction with the accompanying drawings in which.

DETAILED DESCRIPTION OF AN
ILLUSTRATIVE EMBODIMENT

Figure 1:
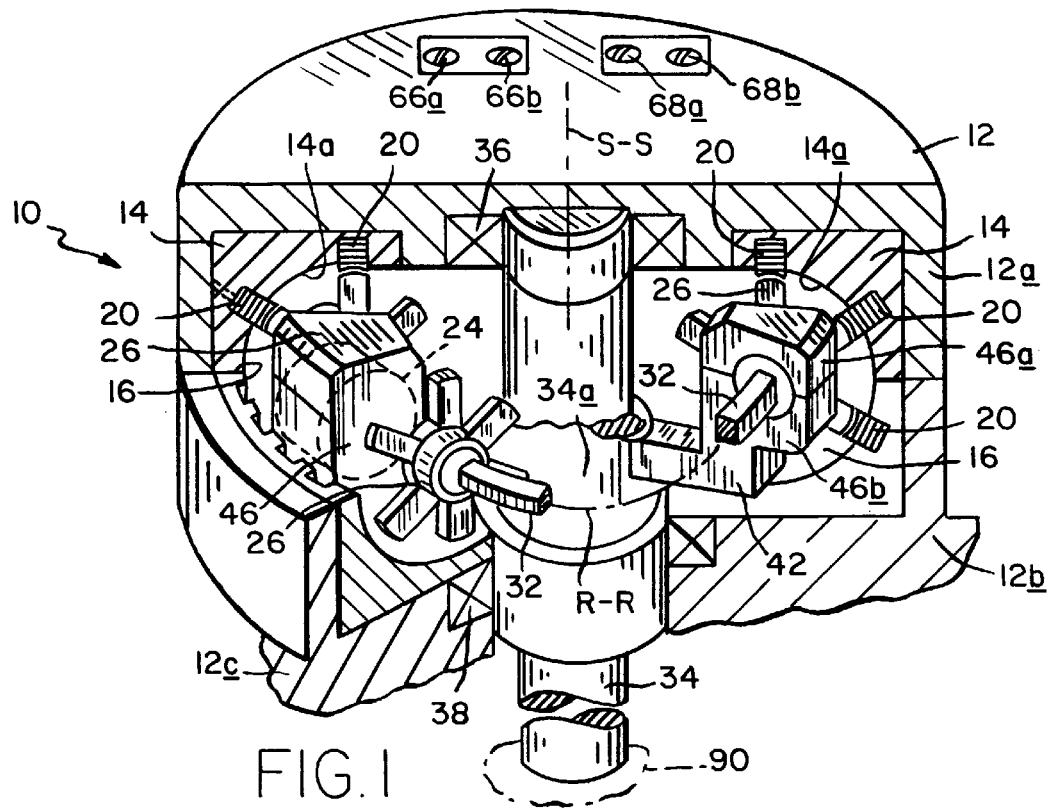
FIG. 1 is a perspective view, partly broken away, of a toroidal electrical motor embodying the principles of the invention.

Referring now to the drawings, and initially to FIG. 1 thereof, there is shown a toroidal electrical motor 10 embodying the principles of the invention. The motor 10 includes a housing 12 having an insert 14 with an internal surface 14a. The internal surface 14a of the insert 14 defines an inner cavity 16 having a geometrical shape corresponding at least generally to that of a torus. The toroidal inner cavity 16 has a circular central axis R—R.

A plurality of electromagnetic field-producing stator elements 20 are mounted on the internal surface 14a of the housing insert 14. The stator elements 20 are in a plurality of separate groups, with each group being arranged along a spiral-or helix-like path 24 about the axis R—R, and with the helix-like paths 24 of each group being generally parallel to one another. A plurality of planetary rotor members 26 are rotatively mounted at spaced apart locations on a circular support shaft or ring 32 having a non-circular, e.g., square, cross-section. The ring 32 has a circular central axis that is coincident with the circular axis R—R of the toroidal cavity 16. If the ring axis R—R is considered to be in a horizontal plane, as viewed in FIG. 1, then the rotor members 26 rotate in vertical planes about the ring axis R—R. While the rotor members 26 are capable of rotating about the ring axis R—R, they are fixed axially to the ring 32. A linear output shaft 34 is journalled relative to the housing 12 within upper and lower circular bearings 36 and 38, respectively. The linear output shaft 34 is connected to the ring 32 by a series of L-shaped connecting arms 42 spaced about the ring 32. The output shaft 34 thus rotates with the ring 32 but about a linear axis S—S that is normal to the plane containing the circular ring axis R—R.

The planetary rotor members 26 are axially fixed to the ring 32 by a set of wedge-shaped spacer clamps 46. Each clamp 46 comprises an upper clamp section 46a and a lower clamp section 46b which clamp together around the ring 32, and are held tightly together on the ring 32 by any suitable means such as bolts (not shown). The L-shaped connecting arms 42 are connected between the lower clamp sections 46b and an enlarged diameter portion 34a of the linear output shaft 34.

The housing 12 of the motor 10 illustratively comprises a pair of separable upper and lower sections 12a and 12b which are secured together by bolts (not shown) extending through appropriately sized and positioned bolt holes in the housing sections. The lower housing section 12b includes a flange 12c containing an array of screw holes (not shown) for mounting the motor 10 on a stable base. The motor 10 is shown connected to a piece of driven equipment, shown in phantom at 90, through the output shaft 34.

Figure 2:
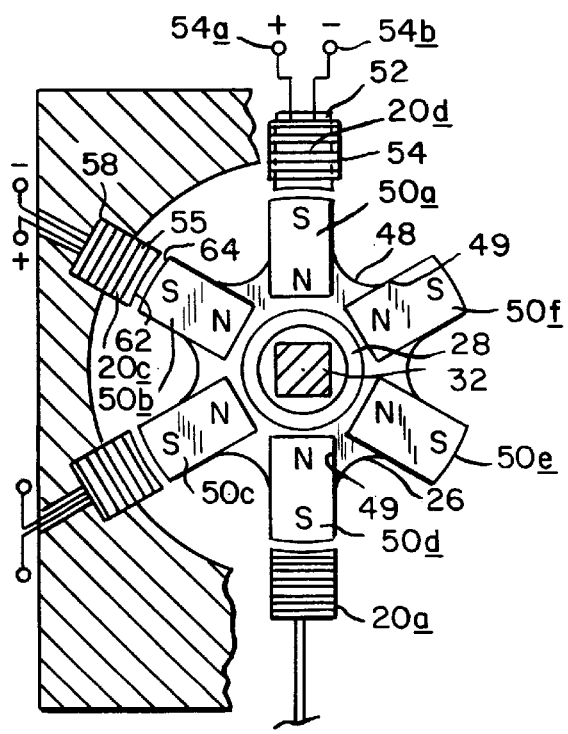
FIG. 2 is a schematic illustration showing the peripheral rotor elements of one rotor member of the toroidal motor of FIG. 1 in relationship to the stator elements in one helical path on the toroidal internal surface of the motor's stator housing.

Referring now to FIG. 2, each rotor member 26 comprises a generally cylindrical ball bearing hub 28 rotatively fixed to the ring 32, and a generally star-shaped wheel 48 which rotates about the ball bearing hub 28. A array of spaced-apart radial sockets or notches 49 are distributed around the circumference of the wheel 48. The illustrated rotor members 26 have six such notches 49. Mounted in each notch 49 is an electromagnetic field-producing rotor element 50 which is adapted to interact electromagnetically with the stator elements 20 formed in the helical paths 24 along the internal surface 14a of the housing insert 14. In the illustrated embodiment, there are six such rotor elements 50 spaced about the periphery of each rotor member 26. Each of the rotor elements 50 is illustratively a permanent magnet having a fixed north pole N and a fixed south pole S, with the south poles S of each being outboard of its respective north pole N. Suitable materials for the rotor element magnets 50 include high strength, permanently magnetized materials such as samarium or samarium alloys, or paramagnetic, low remanence materials, such as transformer laminar steels which have been appropriately premagnetized.

The stator elements 20 are illustratively in the form of electromagnets capable of producing electromagnetic fields of varying polarities. As shown, for example, for the stator element labeled 20d at the top of FIG. 2, it comprises a ferromagnetic core 52 surrounded by a coil or winding 54 of an electrical conductor having terminals 54a and is 54b. By applying a voltage of a first polarity across the terminals 54a and 54b of the winding 54, the stator element electromagnet 20a will produce an electromagnetic field of a first polarity, e.g., one with a radially inboard north pole N and a radially outboard south pole S. By reversing the polarity of the voltage applied across the terminals 54a and 54b of the winding 54, the stator element electromagnet 20a will produce an electromagnetic field of a second, opposite polarity, e.g., one with an inboard south pole S and an outboard north pole N. By periodically reversing the polarity of the applied voltage, the inboard pole of each stator element electromagnet 20a periodically alternates between a south pole S and a north pole N. The other stator elements 20a, 20b and 20c shown in FIG. 2 are identical to the stator element 20 and just described.

Figure 3:
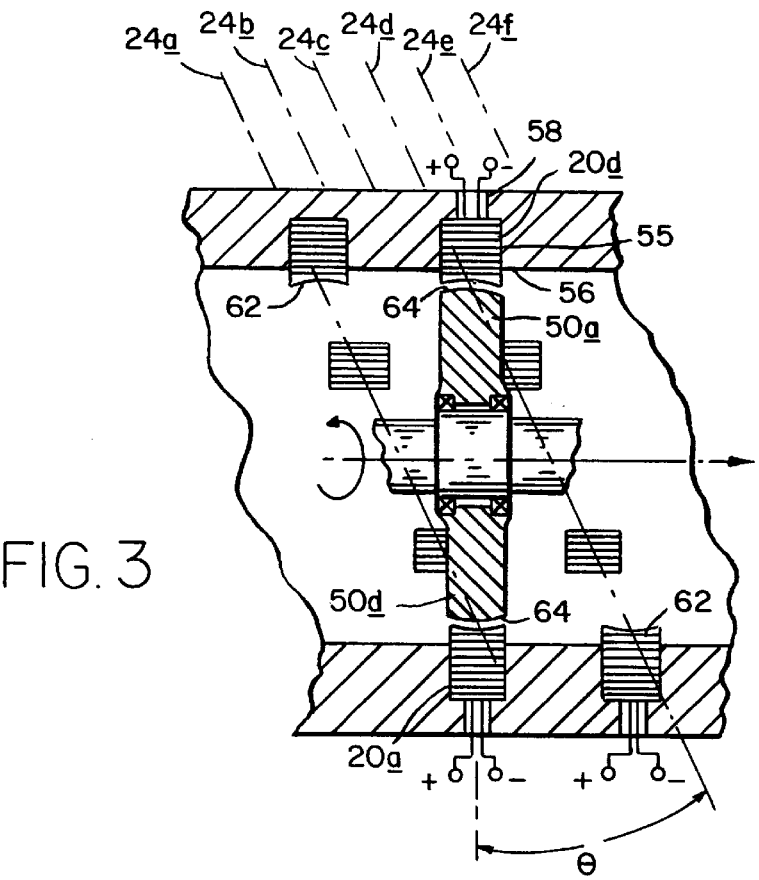
FIG. 3 is a schematic illustration, taken along a line of sight that is generally normal to the plane of FIG. 2, showing the positioning of the rotor elements of one rotor member relative to the stator elements in a plurality of parallel helical paths on the stator housing toroidal internal surface.

FIG. 3 illustrates the arrangement of the rotor element magnets 50 of one of the rotor members 26 relative to the stator element electromagnets 20 in the parallel, helical paths 24 on the inner surface 14a of the housing insert 14. The view of FIG. 3 is taken along a line of sight that is generally normal to the plane of FIG. 2. In the illustrated embodiment, there are a total of six groups of stator element electromagnets 20 arranged in six parallel helical paths 24a through 24f, respectively, along the surface 14a. The stator element electromagnets 20 are mounted to the surface 14a by press-fitting them in shallow recesses 55 surrounded by raised bosses 56 formed on the surface 14a and spaced along the center lines of each of the helical paths 24a through 24f. A through-hole 58 extends through the housing insert 14 near the center of each shallow recess 55. This is to allow the terminals 54a and 54b of each electromagnet winding 54 to be fed through to the exterior of the housing insert 14, where they can be electrically connected for utilization of the motor 10, as discussed in more detail below.

In the illustrated embodiment, each rotor element magnet 50 is associated with a different one of the six groups of helically arranged stator elements electromagnets 20. Thus, as shown in FIGS. 2 and 3, at a given point in time, four of the rotor element magnets labeled 50d, 50c, 50b and 50a will be directly aligned with four stator element electromagnets labeled 20a, 20b, 20c and 20d, respectively, one from each of four adjacent parallel paths 24a, 24b, 24c and 24d, respectively. The remaining two of the rotor element magnets 50e and 50f will point inwardly toward the center of the motor 10, i.e., to the right in FIG. 2, and not be associated or aligned with any of the stator element electromagnets 20.

When a rotor member 26 is rotated about the ring 32 so that the rotor element magnet 50a moves downwardly into the plane of FIG. 3 along the path 24d, and the rotor element 50d moves upwardly out of the plane of FIG. 3 along the path 24a, the entire rotor member 26 will precess axially in one direction along the circular axis R—R, i.e., to the right in FIG. 3. On the other hand, if the rotor member 26 is rotated in the opposite direction so that the rotor element magnet 50a moves upwardly out of the plane of FIG. 3 along path 24d and rotor element magnet 50d moves downwardly into the plane of FIG. 3 along path 24a, the entire rotor member 26 will precess axially in the opposite direction along the circular axis R—R, i.e., to the left in FIG. 3. Thus, as each rotor member 26 rotates about the ring 32 and advances axially along the ring axis R—R, each of its six rotor element magnets 50a through 50f follows a helix-like path in association with every sixth group of stator element electromagnets 20 formed in the parallel paths 24a through 24f in the motor 10.

As will be appreciated from the orthogonal views of FIGS. 2 and 3, each stator element electromagnet 20 has a radially inboard end surface 62 that has the shape of a concave calotte or sphere. Similarly, each rotor element magnet 50 has a radially outboard end surface 64 that has a complementary shape of a convex calotte or sphere. As a result, the respective end surfaces 62 and 64 are separated from one another by a thin air gap that is of uniform thickness. This shaping of the stator and rotor element end surfaces 62 and 64 serves to concentrate the electromagnetic fields produced by aligned or nearly aligned stator and rotor element pairs, and to minimize interference from fringe electromagnetic fields produced by neighboring elements. Those skilled in the art will appreciate that the shaping may be done in reverse so that the stator element end surfaces 62 have the shape of a convex calotte and the rotor element end surfaces 64 have the shape of a complementary concave calotte, with the attainment of the same advantages.

In operation, the terminals 54a and 54b of the windings 54 of every other stator element electromagnet 50 in each group, e.g., every odd-numbered electromagnet 50 in each group, are electrically connected together and to a first set of motor terminals 66a and 66b (FIG. 1). The terminals 54a and 54b of the windings of the remaining stator element electromagnets 50 in each group, e.g., every even-numbered electromagnet 50 in each group, are electrically connected together and to a second set of motor terminals 68a and 68b (FIG. 1). An electrical voltage of a first polarity is applied to the motor input is terminals 66a and 66b, while an electrical voltage of a second, opposite polarity is applied to the motor input terminals 68a and 68b. The polarities of the voltages applied to the motor terminals 66a and 66b on the one hand, and 68a and 68b on the other then inverted or reversed at a frequency f.

As a result, the stator element electromagnets 20 in each group set up electromagnetic fields with poles facing inboard toward the ring axis R—R that are alternately south S and north N as one moves along the helical path 24 for that group. The north poles N of each electromagnet 20 in each group also appear to travel along the center line of the helical path 24 for that group at a rate related to the frequency f due to the periodic reversal of the input voltages. According to well-known principles of electromagnetic theory, the outboard south poles S of the rotor element magnets 50 will be repelled by the inboard south poles S of the stator element electromagnets 20 in each group, but will seek to line up with, and follow, the inboard north poles N of the stator element electromagnets 20 in each group. As a result of this interaction of electromagnetic fields, the rotor members 26 will rotate in unison about the ring axis R—R. The rotating rotor members 26, in turn, will move in one direction or the other along the helical paths 24 and are thereby displaced around the toroidal cavity 16 about the shaft axis S—S. Since the rotor members 26 are axially fixed to the ring 32, they carry the ring with them causing the ring 32 also to revolve about the axis S—S. As the ring 32 revolves, so too does the output shaft 34 connected to the ring by connecting arms 42. The speed of rotation of the output shaft 34 is directly related to the frequency f at which the input voltage signals are reversed.

The pitch or lead angle θ (FIG. 3) of the helical path center lines 24a through 24f along which the stator element electromagnets 50 are arranged may be such as to require four revolutions of the rotor members 26 about the ring 32 for each single revolution of the ring 32 and output shaft 34 relative to the housing 22. Thus, the electrical motor 10 of the invention has an inherent speed reduction factor of 4:1. This speed reduction factor can readily be increased by decreasing the lead angle θ, i.e., increasing the pitch, of the helical path center lines 24a through 24f, or by increasing the ratio of the number of rotor element magnets 50 to the number of center lines 24 along which the stator element electromagnets 20 are aligned. In fact, as will be appreciated by those skilled in the art from a review of my prior U.S. Pat. No. 4,297,919 directed to a toroidal transmission, the disclosure of which is incorporated herein by reference, the stator element electromagnets 20 may be arranged along a single helical path of a given pitch which continues around and around the internal surface 14a of the housing insert 14 with the path convolutions in the second and succeeding revolutions of the same path being interlaced. In this way, any of a wide range of speed reduction factors, up to 24:1 or higher, may be built into the electrical motor 10 without the need for cumbersome and inefficient mechanical gear reduction mechanisms.

Because the rotor members 26 revolve about both the ring axis R—R in vertical planes and the shaft axis S—S in a horizontal plane, fall advantage is taken of the relatively large volume toroidal inner cavity 16 for electromagnetic field interaction in the motor 10. The volume of the toroidal cavity 16 is equal to $\pi^2$ dD, where d is the diameter of toroidal cavity 16 in cross-section (in a vertical plane) and D is the diameter of the toroidal cavity 16 in circumference (in a horizontal plane). The volume of a conventional cylindrical stator cavity is equal to πdL, where d is the cross-sectional diameter of the cylinder and L is its length. Thus, the interaction volume of the toroidal cavity 16 is more than three times larger than that provided by a conventional cylindrical stator cavity whose length L is about equal to the diameter D. This larger interaction volume results in the attainment of higher torques and higher output powers than are possible with comparably sized cylindrical motors.

Figure 4:
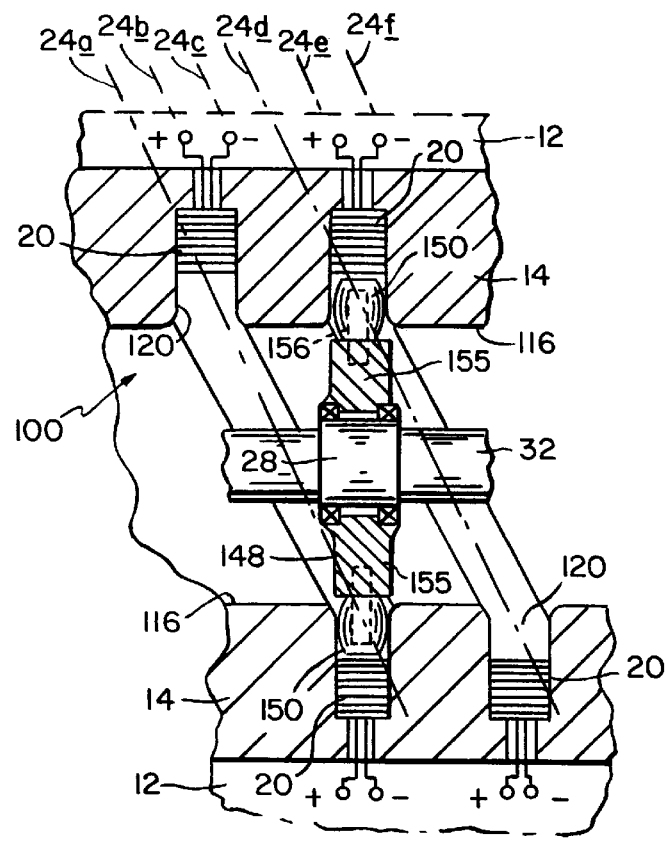
FIG. 4 is a schematic illustration, similar to that of FIG. 3, but showing a modified rotor member embodying rolling teeth rotor elements and stator elements which are recessed in parallel helical grooves or races formed in the stator housing internal surface and in which the rolling teeth rotor elements ride, this embodiment being adapted for use as an electrical generator.

The description so far has been directed to one embodiment of the invention in the form of electrical motor 10 which converts electrical energy to mechanical rotary motion which is imparted to and utilized in a piece of driven equipment, shown in phantom at 90 in FIG. 1. Those skilled in the art will appreciate that the equipment 90 may be a source of mechanical rotary motion such as an internal-combustion engine, turbine or the like and the machine of the invention may be operated in reverse as an electrical generator which converts the mechanical rotary motion to electrical energy. FIG. 4 of the drawing illustrates schematically a portion of one such embodiment in the form of electrical generator 100. The parts of the generator 100 that are substantially identical to those of the motor 10 are labeled with the same reference numerals in FIG. 4.

Referring to FIG. 4, generator 100 comprises stator housing 12 with housing insert 14 having a toroidal internal surface 116 similar to the toroidal internal surface 16 of the motor 10. However, in the surface 116, there are formed a plurality of helical, generally parallel grooves or races 120. The grooves 120 have center lines corresponding to the is center lines 24a through 24f of the helical paths 24 along which the stator elements 20 in the motor 10 are arranged. The stator elements 20 in the generator 100, however, are recessed relative to the surface 116, inside the grooves 120.

A plurality of planetary rotor members 126 are rotatively mounted at spaced-apart locations on ring 32. Like the rotor members 26 in the motor 10, the rotor members 126 in the generator 100 are capable of rotating about the axis of ring 32, but are fixed axially to the ring 32. These are each comprised of a ball bearing hub 28 rotatively fixed to the ring 32, and a wheel 148 which rotates about the hub 28. The wheel 148 has a circular array of spokes 155 radiating outwardly from the hub 28. Mounted at the outer end of each spoke 155 is a rolling tooth 150 similar to those employed on the planetary rotor members of the toroidal transmission disclosed in my U.S. Pat. No. 4,297,919. Each rolling tooth 150 includes a core 152 secured to the end of the spoke 155, and a barrel-shaped roller 156 that is capable of rolling or rotating about the core 152. Unlike the rolling teeth employed in my toroidal transmission, the core 152 of each rolling tooth 150 in the generator 100 is formed of a permanently magnetized or pre-magnetized paramagnetic material with fixed north N and south S poles.

The rolling teeth 150 engage in the grooves 120 in essentially the same way that the rolling teeth of the planetary rotor members of my toroidal transmission engage in the helical grooves of the transmission housing.

Referring again briefly to FIG. 1, and considering the case where the equipment shown in phantom at 90 there is a source of mechanical rotary motion, the rotation of the shaft 34 by the source 90 causes ring 32 to rotate relative to housing 12 and rotor members 126 to rotate about ring 32. The motion of the magnetic poles of the rolling teeth cores 152 relative to the windings of the stator elements electromagnets 20 induces electrical currents in the windings of the electromagnets 20. These currents may be extracted for processing and utilization at terminals 66a, 66b, 68a and 68b at the exterior of the stator housing 12.

By properly selecting the pitch or lead angle θ of the helical grooves 120 and the number of rotor rolling teeth 150 relative to the number of grooves 120, the generator 100 may be provided with a speed enhancement characteristic. Thus, only a relatively slow rotation of the shaft 34 relative to the housing 12 is required to obtain a relatively rapid relative motion between the stator element electromagnets 20 and the magnetized rolling teeth 150 on the rotor member 120.

The foregoing detailed description has been directed to specific embodiments of the invention. It will be apparent, however, that other variations and modifications may be made to the described embodiments, with the attainment of some or all of the advantages mentioned above. For example, it is possible to utilize a helically grooved stator housing internal surface like that shown in FIG. 4 in an electrical motor embodiment of the invention as well, with the stator elements being recessed in the grooves and the rotor elements interacting with the stator elements in the grooves. Additionally, those skilled in the art will appreciate that the stator elements may be permanent magnets and the rotor elements may be electromagnets, or both the stator elements and the rotor elements may be electromagnets. Furthermore, different energizing schemes may be utilized for the electromagnets 20 in the motor embodiment of the invention to achieve the desired operation. For example, instead of using electrical voltages of alternating polarities, the stator element electromagnets 20 in each helical path 24 may be energized serially with unipolar electrical currents to create a similar traveling electromagnetic field to be followed by the rotor elements. It is therefore the object of the appended claims to cover these and other variations and modifications as come within the true scope and spirit of the invention.

What is claimed is:

1. An electrical machine comprising:
  a. a stator defining a generally toroidal cavity, said toroidal cavity having a closed, ring-shaped axis, said stator including a plurality of electromagnetic field-producing stator elements arranged in one or more generally parallel helical paths along said cavity;
  b. a ring shaft mounted for rotation in said stator cavity, said ring shaft having an axis that is generally coincident with the axis of said stator cavity;
  c. a plurality of rotor members rotatively mounted at fixed, spaced-apart angular positions around said ring shaft, each of said rotor members being rotatable about said ring shaft and including a plurality of electromagnetic field-producing rotor elements for interacting with said stator elements of said stator; and
  d. a generally linear shaft having one end connected to said ring shaft and another opposite end extending out of said stator cavity.

2. The electrical machine of claim 1 in which said stator elements comprise electromagnets.

3. The electrical machine of claim 1 in which said stator elements comprise permanent magnets.

4. The electrical machine of claim 1 in which said rotor elements comprise electromagnets.

5. The electrical machine of claim 1 in which said rotor elements comprise permanent magnets.

6. The electrical machine of claim 5 in which said rotor elements are formed of samarium.

7. The electrical machine of claim 5 in which said rotor elements are formed of a paramagnetic, low remanence transformer laminar steel.

8. The electrical machine of claim 1 in which said stator includes an outer housing and an inner housing insert, said inner housing insert having an internal surface that defines said toroidal cavity.

9. The electrical machine of claim 8 in which said stator housing internal surface defines a plurality of raised bosses spaced apart along each of said generally parallel helical paths and in which said stator elements are mounted to said stator housing internal surface by press-fitting them in said raised bosses.

10. The electrical machine of claim 8 in which said stator housing internal surface defines a plurality of grooves having center lines that are coincident with said one or more helical paths, in which said stator elements are recessed in said grooves, and in which said rotor elements of said rotor members engage in said grooves.

11. The electrical machine of claim 10 in which each of said rotor elements is in the form of a rolling tooth that makes rolling engagement with said grooves.

12. The electrical machine of claim 1 further including means for energizing either said stator elements or said rotor elements to create electromagnetic fields which interact to cause said rotor members to rotate about said ring shaft and said ring shaft to rotate in said stator cavity, said ring shaft, in turn, causing rotation of said linear shaft, whereby said machine is adapted for use as an electrical motor.

13. The electrical machine of claim 12 wherein said energizing means comprise means for supplying electrical voltages of alternating polarities to said stator elements.

14. The electrical machine of claim 13 in which said electrical voltage supplying means reverses the polarity of the electrical voltages supplied to said stator elements at a variable frequency f, and in which said linear shaft rotates at a speed that is related to said frequency f.

15. The electrical machine of claim 1 further including means to drive said linear shaft mechanically in rotation relative to said stator to cause, in turn, rotation of said ring shaft in said stator and rotation of said rotor members about said ring shaft, the electromagnetic fields produced by said rotor elements interacting with said stator elements to generate electrical currents in said stator elements which may be extracted for utilization from said machine, whereby said machine is adapted for use as an electrical generator.

16. The electrical machine of claim 1 in which said one or more helical paths have a pitch or lead angle and in which said pitch or lead angle is such that said rotor members make a plurality of revolutions about said ring axis for each single revolution of said ring axis in said stator cavity.

17. The electrical machine of claim 1 in which the ratio of the number of said rotor elements to the number of the helical paths along which said stator elements are arranged is such that said rotor members make a plurality of revolutions about said ring axis for each single revolution of said ring axis in said stator cavity.

18. The electrical machine of claim 1 wherein said axis occupies a first plane and wherein each of said rotor members rotates about said ring axis in planes that are normal to said first plane.

19. The electrical machine of claim 1 wherein each of said stator elements has a terminal surface facing toward the axis of said stator cavity, and each of said rotor elements has a terminal surface facing away from said stator cavity axis, said terminal surfaces of said stator elements and said rotor elements being separated by a relatively thin gap.

20. The electrical machine of claim 19 in which each of said rotor element terminal surfaces has a convexly curved configuration and each of said stator element terminal surfaces has a complementary concavely curved configuration so that the gap between said terminal surfaces is of generally uniform thickness.

21. The electrical machine of claim 19 in which each of said stator element terminal surfaces has a concavely curved configuration and each of said rotor element terminal surfaces has a complementary convexly curved configuration so that the gap between said terminal surfaces is of generally uniform thickness.

* * * * *